(12) United States Patent
Osawa et al.

(10) Patent No.: US 9,457,660 B2
(45) Date of Patent: Oct. 4, 2016

(54) ACCELERATOR PEDAL APPARATUS

(75) Inventors: Tsuyoshi Osawa, Kanagawa (JP);
Masato Kumamoto, Kanagawa (JP);
Yoshitomo Fukushima, Kanagawa
(JP); Kouji Kikuchi, Kanagawa (JP);
Tsuyoshi Shimizu, Kanagawa (JP);
Hisashi Kawade, Kanagawa (JP);
Hiromutsu Touhachi, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 615 days.

(21) Appl. No.: 12/923,442

(22) Filed: Sep. 21, 2010

(65) Prior Publication Data

US 2011/0083528 A1    Apr. 14, 2011

(30) Foreign Application Priority Data

Sep. 24, 2009   (JP) ................. 2009-218639

(51) Int. Cl.
*B60K 26/02* (2006.01)
*G05G 5/03* (2008.04)
*G05G 1/44* (2008.04)

(52) U.S. Cl.
CPC .............. *B60K 26/021* (2013.01); *G05G 5/03* (2013.01); *G05G 1/44* (2013.01); *Y10T 74/20534* (2015.01)

(58) Field of Classification Search
CPC .... B60K 26/021; B60K 26/02; B60K 26/04; G05G 1/38; G05G 1/44; G05G 1/445; G05G 1/46; G05G 1/30; G05G 5/03; B60T 11/08
USPC ........... 74/512–514, 560, 518, 478; 267/173, 267/174, 178, 248–253, 255; 200/61.89, 200/86.5, 61.29
See application file for complete search history.

(56) References Cited

U.S. PATENT DOCUMENTS 2,411,167 A * 11/1946 Perry ........................ 477/212
3,999,641 A * 12/1976 Luttrell .................. 192/220.1

(Continued)

FOREIGN PATENT DOCUMENTS

DE       10046653 A1 *  4/2001
DE       10121317 A1 * 11/2002

(Continued)

OTHER PUBLICATIONS

Description DE10046653. European Patent Office: Patent Translate. http://translationportal.epo.org/emtp/translate/?Action=description-retrieval&COUNTRY=DE&ENGINE=google&FORMAT=doc-db&KIND=A1&LOCALE=en_EP&Number=102004025829&Ops=ops. epo.org&SRCLANG=de&TRGLANG=en.*

(Continued)

*Primary Examiner* — Daniel Yabut (57) ABSTRACT

An accelerator pedal apparatus includes a pedal arm rotating around a first rotation axis line, a return spring and a reaction force adding mechanism including a drive source and a rotation member rotating around a second rotation axis line and having a contact portion contacted to the pedal arm which adds reaction force in the direction to return the pedal arm to the rest position. A first distance from the contact position of the pedal arm with the contact portion to the first rotation axis line is longer than a second distance to the second rotation axis line. The pedal arm includes a contact section having the contact portion displaced while being contacted so that the contact portion is to be farther from the first rotation axis line when rotating toward the maximum depression position and to be closer to the first rotation axis line when rotating toward the rest position.

2 Claims, 6 Drawing Sheets

(56) References Cited

U.S. PATENT DOCUMENTS

| | | | |
|---|---|---|---|
| 6,263,758 B1* | 7/2001 | Kumamoto et al. | 74/513 |
| 7,770,491 B2* | 8/2010 | Ritter et al. | 74/560 |
| 2005/0016318 A1* | 1/2005 | Allard et al. | 74/512 |
| 2005/0160836 A1* | 7/2005 | Hayakawa et al. | 73/862.381 |
| 2006/0117902 A1* | 6/2006 | Martin | G05G 1/38 74/512 |
| 2006/0157028 A1* | 7/2006 | Lee et al. | 74/513 |
| 2006/0283282 A1* | 12/2006 | Fujiwara | 74/512 |
| 2007/0000345 A1* | 1/2007 | Leone | 74/513 |
| 2007/0245844 A1* | 10/2007 | Yokoyama et al. | 74/512 |
| 2007/0289402 A1* | 12/2007 | La et al. | 74/513 |
| 2008/0134830 A1* | 6/2008 | Park | 74/514 |
| 2010/0037726 A1* | 2/2010 | Beck | 74/514 |

FOREIGN PATENT DOCUMENTS

| | | | |
|---|---|---|---|
| DE | 10 2004 025 829 A1 | | 12/2005 |
| JP | 05112217 A | * | 5/1993 |
| JP | 05185912 A | * | 7/1993 |
| JP | 2001310647 A | * | 11/2001 |
| JP | 2001310648 A | * | 11/2001 |
| JP | 2002114052 A | * | 4/2002 |
| JP | 2007191009 A | * | 8/2007 |
| JP | 2007-528177 | | 9/2007 |
| KR | 20070109045 | * | 11/2007 |

OTHER PUBLICATIONS

Description DE102004025829. European Patent Office: Patent Translate. http://translationportal.epo.org/emtp/translate/?ACTION=description-retrieval&COUNTRY=DE&ENGINE=google&FORMAT=docdb&KIND=A1&LOCALE=en_EP&NUMBER=102004025829&OPS=ops.epo.org&SRCLANG=de&TRGLANG=en.*

* cited by examiner

ACCELERATOR PEDAL APPARATUS

CROSS-REFERENCE TO RELATED APPLICATIONS

This application claims the priority benefit of Japanese Patent Application No. 2009-218639, filed on Sep. 24, 2009 in the Japanese Patent Office, the disclosure of which is incorporated herein by reference.

BACKGROUND

1. Field

Embodiments relate to an accelerator pedal apparatus applied to vehicles and the like having a drive-by-wire system, and in particular, relates to an accelerator pedal apparatus capable of performing active control to generate reaction force (i.e., resistance force or press-back force) against tread force of a pedal arm for danger avoidance, danger notification, fuel consumption improvement, and the like.

2. Description of the Related Art

An accelerator pedal apparatus adopted to an electronically controlled throttle system (i.e., a drive-by-wire system) for an engine mounted on an automobile and the like includes a pedal arm (i.e., a pedal element) being rotatably supported to a housing (i.e., a pedal holding member) between a rest position and a maximum depression position while integrally having an accelerator pedal, an active control mechanism to control the accelerator pedal so as to be pressed-back against depression operation of a driver as being contacted to an upper end portion of the pedal arm, and the like. The active control mechanism disclosed in Japanese Patent Publication 2007-526177 includes a movable operation member (i.e., an operation push rod, a bowl-shaped yoke, and a ring-shaped magnet) linearly reciprocating in the approximate horizontal direction, a bowl-shaped coil bearing member fixed to the housing to exert electromagnetic drive force to the movable operation member, a coil wound around the coil bearing member, a spring urging the movable operation member so that the movable operation member (i.e., the operation push-rod thereof) is continuously contacted to the top end portion of the pedal arm, and the like.

Here, the active control mechanism adopts a solenoid type electromagnetic drive system as a drive source. Accordingly, the movable operation member contacted to the top end portion of the pedal arm is shaped elongated to reciprocate linearly in the approximate horizontal direction, so that the apparatus is upsized in the horizontal direction. Further, it is configured that the movable operation member transmits the electromagnetic drive force due to the solenoid type directly to the top end portion of the pedal arm. Therefore, variation in the electromagnetic drive force is directly transmitted to the pedal arm to cause a fear that stable active control operation cannot be performed. Further, the spring included in the active control mechanism is utilized for a return spring to return the pedal arm toward the rest position. Therefore, when the movable operation member is fixed to be non-movable in a state that the spring is compressed, there is a fear that the pedal arm cannot be returned completely to the rest position.

Further, another accelerator pedal apparatus includes a pedal arm (i.e., a pedal element) being rotatably supported to a housing between a rest position and a maximum depression position while integrally having an accelerator pedal, an active control mechanism to control the accelerator pedal so as to press back against depression operation of a driver as being contacted to an upper end portion of the pedal arm, and then, the active control mechanism includes a plunger element linearly reciprocating in the approximate horizontal direction, a torque motor exerting reciprocating drive force to the plunger element, a coil spring urging the plunger element to be continuously contacted to the top end portion of the pedal arm, and the like. An example of the above-noted accelerator pedal apparatus is disclosed in German Patent Publication DE 10-2004-025829A1.

Here, in the active control mechanism, the plunger element contacted to the top end portion of the pedal arm is shaped elongated to reciprocate linearly in the approximate horizontal direction, so that the apparatus is upsized in the horizontal direction. Further, it is configured that a rotation type torque motor is adopted as a drive source of the plunger element and the rotational drive force of the torque motor is converted into linear drive force of the plunger element via a pin to set arm length of the rotation torque to be approximately constant. Therefore, variation in the drive force (i.e., the torque) within the operational range of the torque motor is directly transmitted to the pedal arm via the plunger element to cause a fear that stable active control operation cannot be performed.

Further, similar to the abovementioned technology in the related art, the spring included in the active control mechanism is utilized for a return spring to return the pedal arm toward the rest position. Therefore, when the plunger element is fixed to be non-movable in a state that the spring is compressed, there is a fear that the pedal arm cannot be returned completely to the rest position.

SUMMARY

Therefore, it is one aspect to provide an accelerator pedal apparatus capable of performing active control with quick response while achieving structural simplification, parts count reduction, cost reduction, entire apparatus miniaturization, and the like.

Additional aspects will be set forth in part in the description which follows and, in part, will be apparent from the description, or may be learned by practice of the invention.

In accordance with one aspect, an accelerator pedal apparatus includes a pedal arm interlocked with an accelerator pedal, a housing to support the pedal arm between a rest position and a maximum depression position as being rotatable around a first rotation axis line, a return spring to return the pedal arm toward the rest position, and a reaction force adding mechanism which includes a drive source arranged at the housing and a rotation member having a contact portion being contacted detachably attachable to the pedal arm and being rotated around a second rotation axis line in the same direction as the pedal arm in a state of being contacted to the pedal arm and in which the rotation member adds reaction force in the direction to return the pedal arm to the rest position with drive force of the drive source. Here, first distance from a contact position of the pedal arm with the contact portion to the first rotation axis line is formed longer than second distance from the contact position of the pedal arm with the contact portion to the second rotation axis line, and the pedal arm includes a contact section formed so that the contact portion is displaced to be farther from the first rotation axis line while being contacted to the contact section when the pedal arm is rotated toward the maximum depression position and so that the contact portion is displaced to be closer to the first rotation axis line while being contacted to the contact section when the pedal arm is rotated toward the rest position.

According to an aspect, while the pedal arm is rotated between the rest position and the maximum depression position as an operator (i.e., a driver) operates the accelerator pedal, reaction force (i.e., resistance force or press-back force) can be generated in the direction to return the pedal arm to the rest position against tread force of the operator (i.e. the driver) as activating the reaction force adding mechanism under predetermined conditions. Meanwhile, when tread force is released, the pedal arm is reliably returned to the rest position with urging force of the return spring.

Here, the reaction force adding mechanism may be configured to include the drive source and the rotation member having the contact portion being contacted detachably attachable to the pedal arm and being rotated in the same direction as the pedal arm in a state of being contacted to the pedal arm, and then, may be configured such that the rotation member adds reaction force in the direction to return the pedal arm to the rest position with drive force of the drive source. Accordingly, active control with quick response can be performed while achieving structural simplification, parts count reduction, cost reduction, entire apparatus miniaturization, and the like.

In particular, the first distance from the contact position of the pedal arm with the contact portion of the rotation member to the first rotation axis line of the pedal arm may be formed longer than the second distance from the contact position of the pedal arm with the contact portion of the rotation member to the second rotation axis line of the rotation member. In addition, the pedal arm may include the contact section formed so that the contact portion is displaced to be farther from the first rotation axis line while being contacted to the contact section when the pedal arm is rotated toward the maximum depression position and so that the contact portions is displaced to be closer to the first rotation axis line while being contacted to the contact section when the pedal arm is rotated toward the rest position. Accordingly, the operational angle may be widened as shortening arm length of rotation torque exerted to the pedal arm by the rotation member. Therefore, stable drive force, that is, reaction force (i.e., resistance force) can be generated while achieving miniaturization of the drive source and the entire apparatus.

According to an aspect, it is possible to obtain an accelerator pedal apparatus capable of performing active control with quick response while achieving structural simplification, parts count reduction, cost reduction, entire apparatus miniaturization, and the like.

BRIEF DESCRIPTION OF THE DRAWINGS

These and/or other aspects will become apparent and more readily appreciated from the following description of embodiments, taken in conjunction with the accompanying drawings of which.

DESCRIPTION OF EMBODIMENTS

Reference will now be made in detail to embodiments, examples of which are illustrated in the accompanying drawings, wherein like reference numerals refer to like elements throughout.

Figure 1:
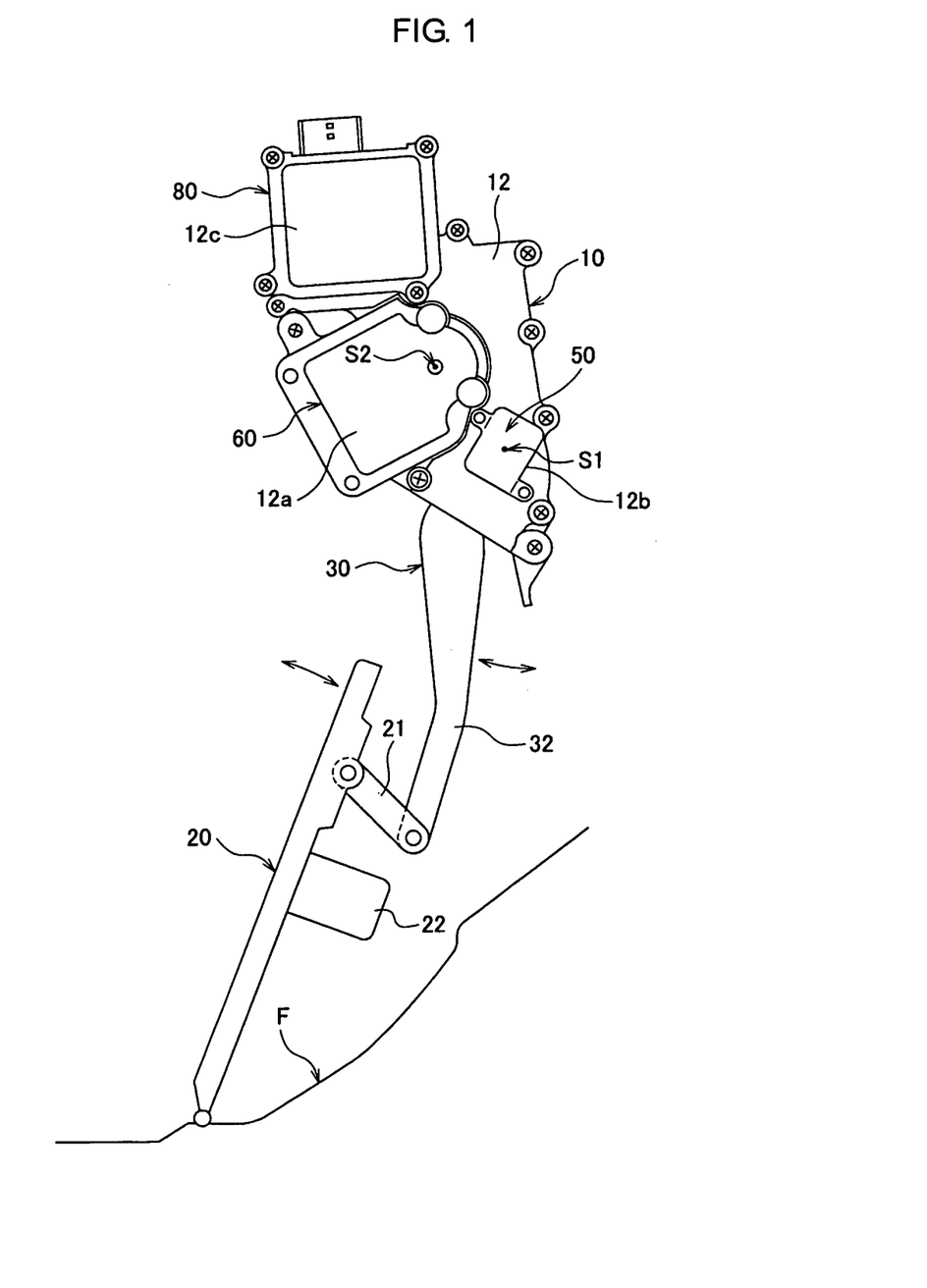
FIG. 1 is a side view which illustrates an accelerator pedal apparatus according to an embodiment.
Figure 2:
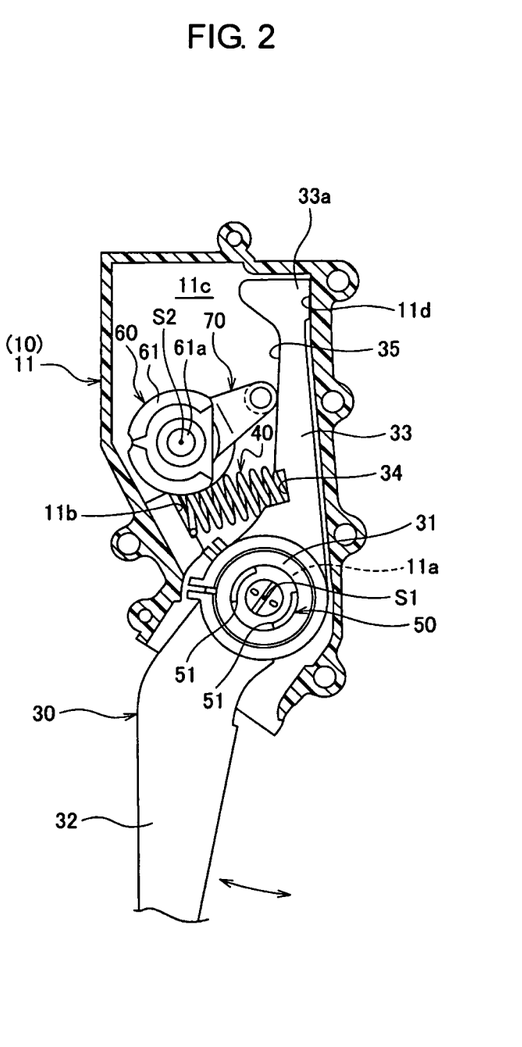
FIG. 2 is a side view which illustrates inner structure of the accelerator pedal apparatus of FIG. 1.
Figure 3:
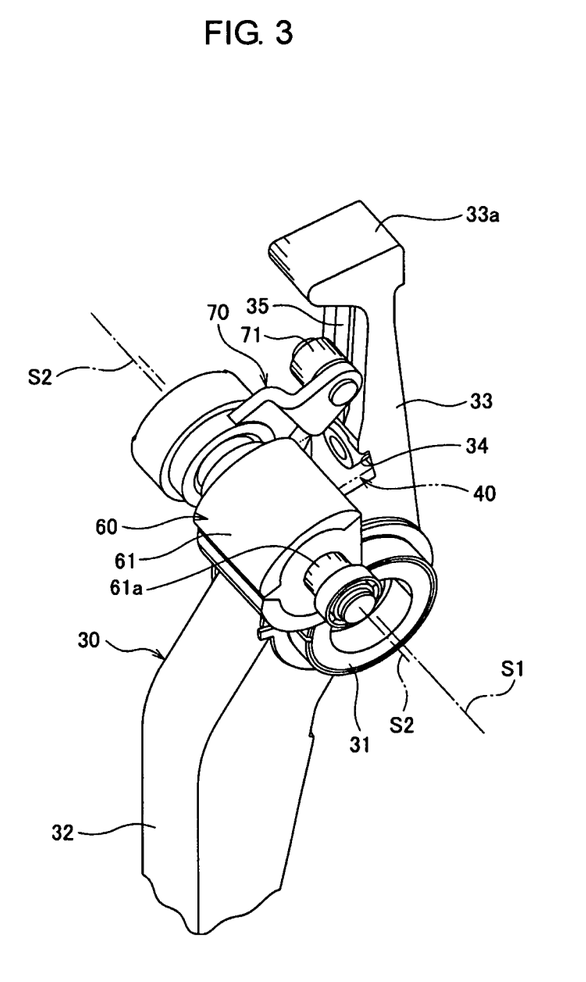
FIG. 3 is a partial perspective view which illustrates a part of the accelerator pedal apparatus of FIG. 1.

As illustrated in FIGS. 1 to 3, the accelerator pedal apparatus includes a housing 10 fixed to a vehicle body of an automobile and the like, an accelerator pedal 20 supported swingably to a floor face F of the vehicle body, a pedal arm 30 supported rotatably having a predetermined first rotation axis line S1 defined by the housing 10 as the center between a rest position to a maximum depression position (i.e., a rotation range) while being interlocked with the accelerator pedal 20, a return spring 40 to exert urging force to return the pedal arm 30 toward the rest position, a position sensor 50 to detect a rotational angle position of the pedal arm 30, a drive source 60 and a rotation member 70 being rotatable around a second rotation axis line S2 defined by a drive shaft 61a of the drive source 60 while having a contact portion 71 to contact to the pedal arm 30 (i.e., a contact section 35 thereof) as a reaction force adding mechanism to add reaction force in the direction to return the pedal arm to the rest position under predetermined conditions, a control unit 80 to perform drive control of the drive source 60, and the like.

The housing 10 is formed of resin material as a whole. As illustrated in FIGS. 1 and 2, the housing 10 is constituted with a housing main body 11 and a housing cover 12 which are mutually coupled with screws.

As illustrated in FIG. 2, the housing main body 11 includes a support shaft 11a to support the pedal arm 30 rotatably around the first rotation axis line S1, a receiving portion 11b to receive one end part of the return spring 40, a concave portion 11c to accommodate a part of the pedal arm 30 and the rotation member 70 and the drive source 60, a rest stopper 11d to stop the pedal arm 30 at the rest position, and the like.

As illustrated in FIG. 1, the housing cover 12 includes an accommodating portion 12a to accommodate the drive source 60, a sensor accommodating portion 12b to accommodate the position sensor 50, a cover portion 12c to cover the control unit 80, and the like.

As illustrated in FIG. 1, the accelerator pedal 20 is connected to the pedal arm 30 (i.e., a pedal side arm 32 thereof) via a link member 21 connected to the rear face of the upper section thereof having the lower end portion connected swingably to the floor face F. Further, the accelerator pedal 20 has a full-open stopper 22 to be contacted to the floor face F to define the maximum depressing position of the pedal arm 30.

The pedal arm 30 is formed of resin material as a whole. As illustrated in FIGS. 1 to 3, the pedal arm 30 includes a cylindrical portion 31 rotatably supported by the support shaft 11a of the housing 10 (defining the first rotation axis line S1), the pedal side arm 32 integrally formed as extending downward (i.e., to one side) from the cylindrical portion 31 (i.e., the first rotation axis line S1), a contact side arm 33 integrally formed as extending upward (i.e. to the other side) from the cylindrical portion 31 (i.e., the first rotation axis line S1), a receiving portion 34 to receive the other end part of the return spring 40 formed at the front face side of the contact side arm 33 as being closer to the cylindrical portion 31, the contact section 35 formed at the front face side in a range between the receiving portion 34 and an upper end portion 33a of the contact side arm 33 to which the contact portion 71 of the rotation member 70 is contacted, and the like.

The pedal arm 30 is rotatable around the first rotation axis line S1 as the cylindrical portion 31 being fitted to the support shaft 11a of the housing 10. Further, the lower end portion of the pedal side arm 32 is connected to the link member 21, as illustrated in FIG. 1.

Figure 4:
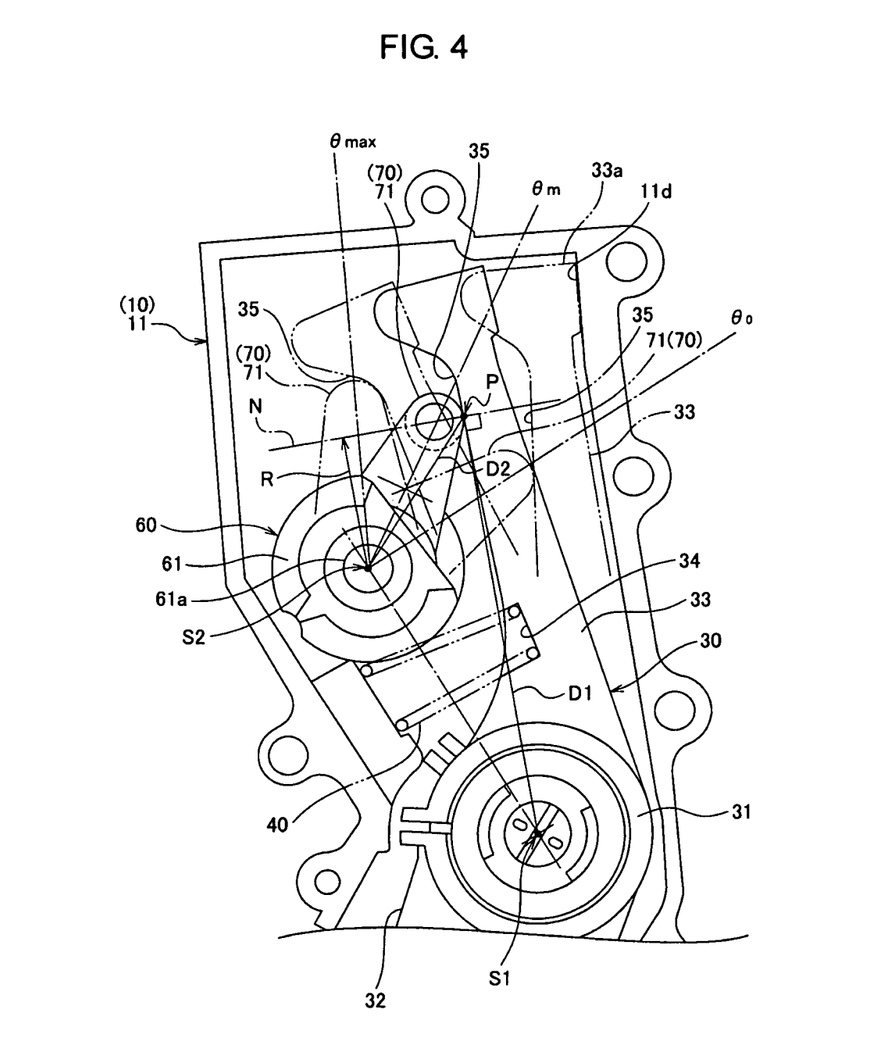
FIG. 4 is a partial side view for description of operation of the accelerator pedal apparatus of FIG. 1.

Further, as illustrated in FIGS. 2 and 4, the pedal arm 30 is rotatable in a rotation range between the rest position where the upper end portion 33a contacts to the rest stopper 11d and the maximum depression position where the full-open stopper 22 contacts to the floor face F.

As illustrated in FIG. 4, the contact section 35 is formed to define a cam profile so that the contact portion 71 of the rotation member 70 is displaced to be farther from the first rotation axis line S1 while being contacted to the contact section 35 when the pedal arm 30 is rotated toward the maximum depression position and so that the contact portion 71 of the rotation member 70 is displaced to be closer to the first rotation axis line S1 while being contacted to the contact section 35 when the pedal arm 30 is rotated toward the rest position.

The return spring 40 is a compression type coil spring formed of spring steel and the like. As illustrated in FIGS. 2 and 4, the return spring 40 is arranged in a state of being compressed to have a predetermined compression amount as the one end part thereof being engaged with the receiving portion 11b of the housing 10 and the other end part thereof being directly engaged with the receiving portion 34 of the pedal arm 30. Accordingly, the return spring 40 directly exerts urging force to the pedal arm 30 to return toward the rest position.

Therefore, even in the case that the reaction force adding mechanism (i.e., the drive source 60 and the rotation member 70) becomes non-movable as being fixed at some midpoint, the pedal arm 30 can be reliably returned to the rest position by the urging force of the return spring 40 when tread force is released.

As illustrated in FIGS. 1 and 2, the position sensor 50 is arranged in the cylindrical portion 31 of the pedal arm 30 and the sensor accommodating portion 12b of the housing cover 12 at the area around the first rotation axis line S1.

The position sensor 50 is a non-contact type magnetic sensor, for example, and is provided with a circular armature (not illustrated) made of magnetic material arranged at the area of the cylindrical portion 31 of the pedal arm 30, a pair of arc-shaped permanent magnets 51 connected to an inner circumferential face of the armature, two stators (not illustrated) made of magnetic material embedded in the housing cover 12, two hall elements (not illustrated) arranged between the two stators, and the like. A circuit board having terminals and various electronic parts mounted is provided as a part relating thereto.

Then, when the pedal arm 30 is rotated, the position sensor 50 detects variation of magnetic flux density with the hall elements and outputs as a voltage signal. In this manner, the angular position of the pedal arm 30 is detected.

As illustrated in FIGS. 2 to 4, the drive source 60 is a torque motor including a rotor 61 having the drive shaft 61a defining the second rotation axis line S2 (i.e., the drive shaft 61a being coaxial to the second rotation axis line S2) at the vicinity of the contact side arm 33 of the pedal arm 30 in the upper area from the first rotation axis line S1 of the pedal arm 30. Further, the drive source 60 is provided with an angle sensor (not illustrated) to detect the rotation angle of the rotor 61 (i.e., the rotation member 70).

The rotor 61 of the drive source 60 is configured to be rotated in an angular range (i.e., the operational angle) between a rest angle $\theta_0$ corresponding to when the pedal arm 30 is located at the rest position and a maximum rotation angle $\theta_{max}$ corresponding to when the pedal arm 30 is located at the maximum depression position via an intermediate angle $\theta_m$ corresponding to when the pedal arm 30 is located at an intermediate depression position.

The rotor 61 integrally rotates the rotation member 70 as directly connecting one end part of the rotation member 70 to the drive shaft 61a.

Figure 6:
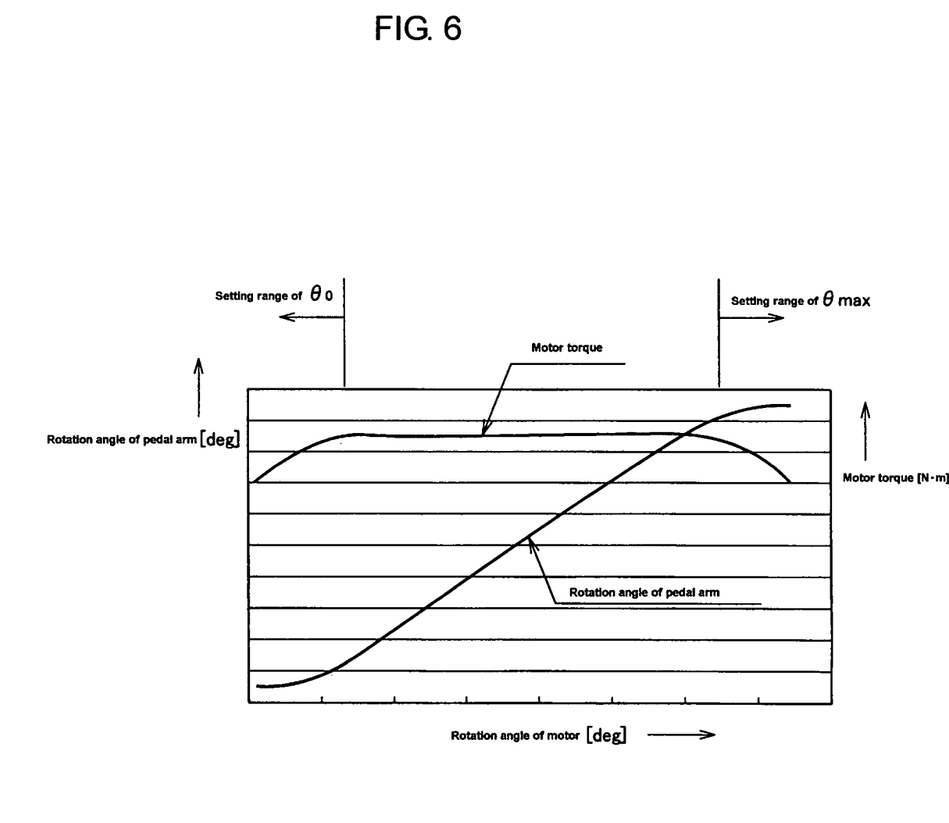
FIG. 6 is a graph which indicates a relationship of rotational drive force (i.e., motor torque) and a rotational angle of a pedal arm against a rotational angle of a drive source (i.e., a torque motor) included in the accelerator pedal apparatus of FIG. 1.

Here, as illustrated in FIG. 6, the characteristics of the rotational drive force (i.e., the motor torque) of the drive source 60 (i.e., the torque motor) against the rotation angle indicate that values in a range of the small motor rotation angle corresponding to the rest angle $\theta_0$ and in a range of the large motor rotation angle corresponding to the maximum rotation angle $\theta_{max}$ are smaller than a value in an intermediate rotation range of the motor rotation angle corresponding to the intermediate angle $\theta_m$.

As illustrated in FIGS. 2 to 4, the rotation member 70 is formed to be a lever-shaped rotation lever by bending a plate-shaped metallic member. The rotation member 70 is directly connected to the drive shaft 61a of the drive source 60 at one end part thereof and includes the contact portion 71 having a roller contacted to the pedal arm 30 (i.e., the contact section 35 thereof) being detachably attachable at the free end part.

The rotation member 70 is rotatable around the second rotation axis line S2 (i.e., the drive shaft 61a) so as to be rotated in the same direction as the pedal arm 30 in a state that the contact portion (i.e., the roller) 71 is contacted to the contact section 35 of the pedal arm 30.

When the drive source 60 does not exert rotational drive force (i.e., rotational torque), the rotation member (i.e., the rotation lever) 70 is rotated to follow the rotation of the pedal arm 30, that is, to follow freely without exerting resistance force against movement of the contact side arm 33 in a state that the contact portion 71 is contacted to the contact section 35. Meanwhile, when the drive source 60 exerts rotational drive force (i.e., rotational torque), the rotation member 70 exerts reaction force (i.e., resistance force or press-back force) in the direction to return the pedal arm 30 to the rest position against the tread force.

In this manner, since the rotation member 70 exerts reaction force (i.e., resistance force or press-back force) as rotating in the same direction as the rotation direction of the pedal arm 30 toward the rest position, the first rotation axis line S1 of the pedal arm 30 and the second rotation axis line S2 of the rotation member 70 can be arranged to be mutually closed. Accordingly, aggregation of the structure and miniaturization of the apparatus can be achieved.

Further, the contact portion 71 of the rotation member 70 includes the rolling roller as being contacted to the contact section 35, so that the rotation member (i.e., the rotation lever) 70 is contacted to the contact section 35 of the pedal arm 30 via the roller. Accordingly, friction and resistance at the contact boundary face can be suppressed and energy loss can be reduced, so that active control can be performed effectively and smoothly.

Furthermore, as described above, the drive source 60 is a torque motor having the drive shaft 61a being integrally rotated coaxially to the second rotation axis line S2. The rotation member 70 is a rotation lever defining the contact portion 71 at the free end thereof. The torque motor being the drive source 60 is a direct-drive type to directly rotate the rotation lever being the rotation member 70. Accordingly, structural simplification can be achieved due to reduction of a parts count and the rotational drive force of the torque motor (i.e., the drive source 60) can be effectively converted into the rotation torque of the rotation lever (i.e., the rotation member 70) with little loss.

Here, description will be provided of the arrangement relation among the first rotation axis line S1 of the pedal arm 30, the second rotation axis line S2 of the rotation member 70, the contact portion 71, and the contact section 35.

First, as illustrated in FIG. 4, first distance D1 from a position P at which the contact portion 71 is contacted to the pedal arm 30 (i.e., the contact section 35 thereof) to the first rotation axis line S1 is formed (i.e., arranged) to be longer than second distance D2 from the position P at which the contact portion 71 is contacted to the pedal arm 30 (i.e., the contact section 35 thereof) to the second rotation axis line S2.

Further, as illustrated in FIG. 4, it is configured that the contact portion 71 is displaced to be farther from the first rotation axis line S1 while maintaining the contact when the pedal arm 30 is rotated toward the maximum depression position (from the rest position) and that the contact portion 71 is displaced to be closer to the first rotation axis line S1 while maintaining the contact when the pedal arm 30 is rotated toward the rest position (from the maximum depression position). That is, the contact section 35 of the pedal arm 30 is formed to have a cam profile shape to cause the abovementioned displacement of the contact portion 71.

According to the above arrangement configuration, the operational angle can be widened as shortening arm length of rotation torque exerted to the pedal arm 30 by the rotation member 70. Therefore, stable drive force, that is, reaction force (i.e., resistance force or press-back force) can be generated while achieving miniaturization of the drive source and the entire apparatus.

Further, as illustrated in FIGS. 4, 5A, 5B and 5C, the contact section 35 of the pedal arm 30 is formed so that arm length R from the second rotation axis line S2 to a normal line N at the position P to which the contact portion 71 contacts varies in a rotation range between the rest position and the maximum depression position.

With this configuration, the arm length R of rotation torque exerted to the pedal arm 30 by the rotation member 70 varies corresponding to the rotation range of the pedal arm 30. In the case that drive force of the drive source 60 varies in the rotation range, the arm length R is shortened in a range where drive force of the drive source 60 is small and the arm length R is prolonged in a range where drive force of the drive source 60 is large, for example. Accordingly, reliable active control having quick response can be performed without a fear that the rotation member 70 becomes difficult to be operated due to excessive load.

Figure 5A:
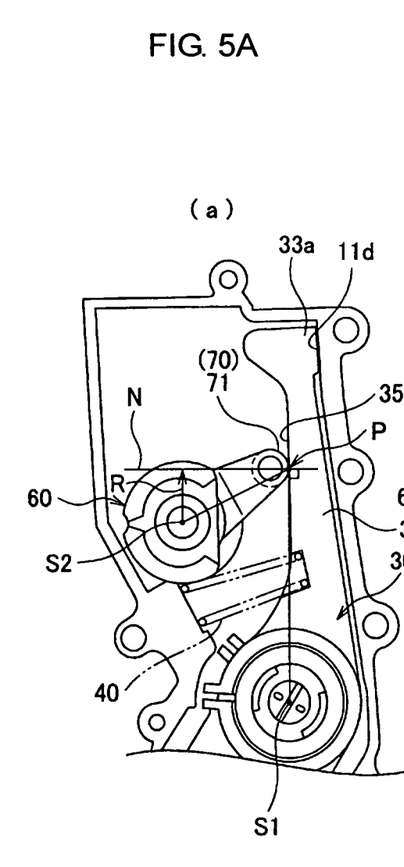
FIGS. 5A to 5C are operational views for description of operation of the accelerator pedal apparatus of FIG. 1.
Figure 5B:
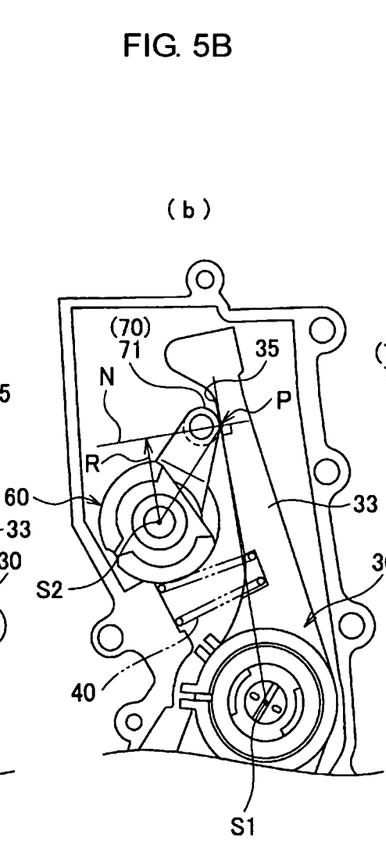
Figure 5C:
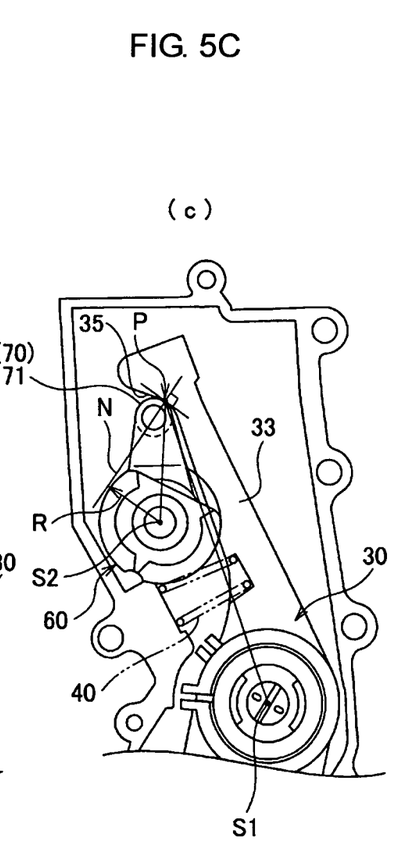

Here, since the drive source 60 is a torque motor indicating rotational torque characteristics as illustrated in FIG. 6, the contact section 35 of the pedal arm 30 is formed so that the arm length R at the vicinities of both ends of the rotation range as illustrated in FIGS. 5A and 5C (i.e., the vicinity of the rest position and the vicinity of the maximum depression position) is shorter than the arm length R at the vicinity of a midpoint of the rotation range as illustrated in FIG. 5B.

With this configuration, in the case that drive force of the drive source is small in an operation area corresponding to vicinities of both ends of a rotation range between the rest position and the maximum depression position and is large in an operation area corresponding to an intermediate area of the rotation range, the rotation member can be smoothly rotated without causing excessive load in the operation area corresponding to the vicinities of the both ends and large reaction force or press-back force can be obtained in accordance with the drive force in the operation area corresponding to the intermediate area.

The control unit 80 is to control driving of the drive source 60 of the reaction force adding mechanism. As illustrated in FIG. 1, the control unit 80 is attached to the inside of a cover portion 12c of the housing cover 12.

By integrating the control unit 80 with the housing 10 as mentioned above, wiring and the like are shortened and reliability is enhanced. Further, the accelerator pedal apparatus having a mechanism (i.e., the reaction force adding mechanism) capable of performing active control can be easily mounted without accompanying major modification at the vehicle side.

With the accelerator pedal apparatus having the above configuration, while the pedal arm is rotated between the rest position and the maximum depression position as an operator (i.e., a driver) operates the accelerator pedal, reaction force (i.e., resistance force or press-back force) can be generated in the direction to return the pedal arm to the rest position against tread force of the operator (i.e. the driver) as activating the reaction force adding mechanism under predetermined conditions (for example, in a case that danger avoidance or danger notification is required during vehicle driving or a case that fuel consumption is to be improved by suppressing excessive depression). Meanwhile, when tread force is released, the pedal arm is reliably returned to the rest position with urging force of the return spring.

Specifically, the reaction force adding mechanism includes the drive source 60 and the rotation member 70 having the contact portion 71 being contacted detachably attachable to the pedal arm 30 and being rotated in the same direction as the pedal arm 30 in a state of being contacted to the pedal arm 30, and then, the rotation member 70 is formed to add reaction force in the direction to return the pedal arm 30 to the rest position with drive force of the drive source 60. Accordingly, reaction force (i.e., resistance force or press-back force) opposed to tread force of the accelerator pedal 30 can be generated quickly and stably for danger avoidance, danger notification, fuel consumption improvement or the like while achieving structural simplification, parts count reduction, cost reduction, entire apparatus miniaturization, and the like. In this manner, active control having quick response can be performed.

Next, operation of the accelerator pedal apparatus will be described.

First, in a state of being at the rest position without depression of the accelerator pedal 20 by an operator (i.e., a driver), the pedal arm 30 is stopped at the rest position as illustrated in FIGS. 2 and 5A as the upper end portion 33a of the pedal arm 30 being contacted to the rest stopper 11d with urging force of the return spring 40.

At that time, the contact portion 71 of the rotation member 70 is kept contacted to the contact section 35 in a state of not exerting reaction force to the pedal arm 30.

When the operator (i.e., the driver) depresses the accelerator pedal 20 from the above state, the pedal arm 30 is rotated counterclockwise in FIGS. 2, 5A, 5B and 5C against urging force of the return spring 40. The pedal arm 30 is rotated to the maximum depression position (i.e., the full-open position) via an intermediate depression position and is stopped as the full-open stopper 22 of the accelerator pedal 20 is contacted to the floor face F. During the depressing operation, the rotation member 70 follows movement of the pedal arm 30 without exerting any load (i.e., resistance force or press-back force).

Meanwhile, when the operator (i.e., the driver) releases tread force, the pedal arm 30 is moved toward the rest position due to urging force of the return spring 40 and is stopped as the upper end portion 33a being contacted to the rest stopper 11d of the housing 10 (i.e., the housing main body 11). During the returning operation, the rotation member 70 follows movement of the pedal arm 30 without exerting any load (i.e., resistance force or press-back force).

Here, in a state that the accelerator pedal 20 is depressed by the operator (i.e., the driver), it is assumed, for example, that press-back for danger avoidance or danger notification or suppression of depressing for fuel consumption improvement is determined to be required, that is, it is assumed being under predetermined conditions. In this case, the drive source 60 of the reaction force adding mechanism is activated and drive control is performed to generate rotational torque clockwise in FIGS. 5A, 5B and 5C at the rotation member 7 and to exert reaction force (i.e., resistance force or press-back force) in the direction to return the pedal arm 30 to the rest position against tread force of the operator (i.e., the driver) based on a control signal from the control unit 80, an output signal from the angle sensor of the drive source 60, and the like. Here, the determination is to be performed by a separate inter-vehicular distance detection system and the like.

In this manner, the responsibility can be enhanced when the active control is required for danger avoidance, danger notification or fuel consumption improvement.

Further, the contact portion 71 of the rotation member 70 is detachably attachable to the contact section 35 of the pedal arm 30 and the return spring 40 exerts urging force directly to the pedal arm 30. Accordingly, even in a case that operational malfunction occurs with the reaction force adding mechanism (i.e. the drive source 60 and the rotational member 70), the pedal arm 30 can be reliably ensured to return toward the safety side (i.e., the rest position).

The description of the above embodiment is performed on the case that only the active control mechanism (i.e., the reaction force adding mechanism) is adopted. However, not limited to this, the present invention may be adopted to a configuration to include a hysteresis generating mechanism to generate hysteresis on the tread force.

In the description of the above embodiment, the pedal arm 30 integrally includes the pedal side arm 32 at the lower side and the contact side arm 33 at the upper side as the first rotation axis line S1 being the center. However, the present invention is not limited to this. For example, with a pedal arm of which upper end portion is rotatably supported by a rotation axis line and of which lower end portion receives tread force of the accelerator pedal, it is possible to adopt a configuration that a contact section is arranged at an intermediate area and a rotation member having a contact portion contacted to the contact section and a drive source are arranged at the vicinity of the back side of the pedal arm.

In the description of the above embodiment, a lever-shaped rotation lever is adopted as the rotation member 70 constituting the reaction force adding mechanism. However, not limited to this, other shapes may be adopted as long as having a contact portion contacted in a detachably attachable manner to the contact section 35 of the pedal arm 30 and being rotated around the second rotation axis line S2.

In the description of the above embodiment, the contact portion 71 of the rotation member 70 includes the roller. However, not limited to the above, it is also possible that the top end portion thereof is formed being curved to be arc-shaped so as to be directly contacted to the contact section 35 without the roller.

In the description of the above embodiment, the rotation member 70 is directly coupled to the drive shaft 61a as the drive source 60 constituting the reaction force adding mechanism. However, other types may be adopted as long as rotational drive force can be exerted to the rotation member 70.

In the description of the above embodiment, the pedal arm 30 is connected to the accelerator pedal 20 via the link member 21 as the pedal arm 30 interlocked with the accelerator pedal 20. However, not limited to this, the present invention may be adopted to a configuration that the accelerator pedal is integrally arranged with the pedal arm.

In the description of the above embodiment, a compression type coil spring is adopted as the return spring 40 urging the pedal arm 30 toward the rest position. However, not limited to this, a torsion type spring may be adopted being arranged around the first rotation axis line S1.

In the description of the above embodiment, the control unit 80 is attached integrally to the housing 10. However, not limited to this, the control unit 80 may be separated from the housing as a separate unit.

As described above for embodiments of the accelerator pedal apparatus, the active control (i.e., the reaction force adding mechanism) capable of generating reaction force or press-back force opposing to tread force of the accelerator pedal can surely function for danger avoidance, danger notification, fuel consumption improvement or the like while achieving structural simplification, parts count reduction, cost reduction, entire apparatus miniaturization, and the like. Further, the accelerator pedal apparatus capable of performing the active control with quick response can be obtained. Therefore, in addition to natural adoptability to various types of automobiles, the embodiments are advantageous for other vehicles and the like.

Although a few embodiments have been shown and described, it would be appreciated by those skilled in the art that changes may be made in these embodiments without departing from the principles and spirit of the invention, the scope of which is defined in the claims and their equivalents.

What is claimed is:
1. An accelerator pedal apparatus comprising:
a pedal arm interlocked with an accelerator pedal;
a housing to support the pedal arm between a rest position and a maximum depression position as being rotatable around a first rotation axis line;
a return spring to return the pedal arm toward the rest position; and
a reaction force adding mechanism which includes a drive source arranged at the housing and a rotation member having a contact portion being contacted detachably attachable to the pedal arm and being rotated around a second rotation axis line in a same direction as the pedal arm in a state of being contacted to the pedal arm and in which the rotation member adds reaction force in the direction to return the pedal arm to the rest position with drive force of the drive source, the drive source being an induction torque motor having a drive shaft integrally rotated coaxially to the second rotation axis line,
wherein the pedal arm includes a pedal side arm which is interlocked with the accelerator pedal and a contact side arm which defines a contact section, the pedal side arm extending to one side and the contact side arm extending to an other side so as to sandwich the first rotation axis line, the contact portion includes a roller in rolling contact with the contact section, a position sensor detecting an angular position of the pedal arm is arranged in the first rotation axis line, a first distance from a contact position of the pedal arm with the contact portion to the first rotation axis line is formed longer than a second distance from the contact position of the pedal arm with the contact portion to the second rotation axis line;

the rotation member is a rotation lever to define the contact portion at a free end of the rotation member;

the contact side arm includes the contact section which has a nonlinear cam profile to convert a rotational drive force of the torque motor into a rotational torque of the rotation lever, and the cam profile is formed so that the contact portion is displaced to recede from the first rotation axis line and approach to an upper end portion of the pedal arm by rolling the roller while the contact portion is contacted to the contact section when the pedal arm is rotated toward the maximum depression position and so that the contact portion is displaced to approach the first rotation axis line while the contact portion is contacted to the contact section by rolling the roller when the pedal arm is rotated toward the rest position;

wherein when the reaction force adding mechanism adds reaction force to the pedal arm in the return direction through the rotation member, the rotation member adds the reaction force to the pedal arm where the contact position is displaced depending on the rotational position of the pedal arm.

2. The accelerator pedal apparatus according to claim 1, wherein the second rotation axis line is arranged to be closer to the contact side arm than the first rotation axis line.

* * * * *